United States Patent [19]
Spitzberg

[11] Patent Number: 4,795,235
[45] Date of Patent: Jan. 3, 1989

[54] BIOPTIC PERISCOPE AND METHOD

[76] Inventor: Larry A. Spitzberg, 14441 Memorial Dr., Houston, Tex. 77079

[21] Appl. No.: 940,854

[22] Filed: Dec. 12, 1986

[51] Int. Cl.⁴ .................. G02B 27/02; G02B 7/02; G02B 23/02; G02C 1/00
[52] U.S. Cl. .................. 350/145; 350/548; 350/569; 351/158
[58] Field of Search ............. 350/145, 146, 537, 547, 350/548, 569, 578; 351/57, 158

[56] References Cited

U.S. PATENT DOCUMENTS

| | | | |
|---|---|---|---|
| 1,610,553 | 12/1926 | Jones | 350/145 |
| 2,058,676 | 10/1936 | Foster | 350/569 |
| 4,195,918 | 4/1980 | Freche et al. | 350/145 |
| 4,704,000 | 11/1987 | Pekar et al. | 350/145 |

OTHER PUBLICATIONS

Kollmorgen Optical Corporation publication entitled "Spectel," Bulletin No. 301, Sep. 1955.
Bailey, I. L., "The Honey-Bee Lens: A Study of its Field Properties," Optometric Monthly, pp. 275-278 (May, 1982).
Edwards Optical Corporation Brochure advertising the BITA* Low Vision Enhancer (undated).

Primary Examiner—John K. Corbin
Assistant Examiner—Ronald M. Kachmarik
Attorney, Agent, or Firm—Cox & Smith Incorporated

[57] ABSTRACT

An apparatus for increasing visual acuity while viewing an image comprising a roof prism having an apex with apex faces adjacent thereto, an eye piece lens mounted to a first apex face of the roof prism, and an objective lens mounted to a second apex face of the roof prism and to the lens of a pair of eyeglasses. The objective lens is mounted to the eyeglasses lens at a point such that the eye of a patient wearing the eyeglasses must be rotated at a angle of from about 25° to about 50° relative to the visual axis of the patient's eye when looking straight ahead to view an image through the apparatus.

23 Claims, 2 Drawing Sheets

BIOPTIC PERISCOPE AND METHOD

BACKGROUND OF THE INVENTION

The present invention pertains to an apparatus for magnifying an image. More particularly, the present invention pertains to a bioptic telescope comprising an eye piece lens, a Schmidt prism, and an objective lens which is mounted to the lens of a pair of eyeglasses.

Low vision patients are patients whose corrected visual acuity in an eye is in the range of 20/100 or worse. Such a patient is capable of distinguishing a letter 61 millimeters high at a distance of 20 feet from the eye of the patient when wearing corrective glasses. Those patients have great difficulty reading signs and distinguishing the shapes of objects, and must wear various low vision aids such as vision-correcting lenses, prisms, and telescopes mounted to the lenses of the eyeglasses. A telescope mounted to the front of an eyeglasses lens is commonly termed a bioptic telescope.

It has now been discovered that a periscope can be mounted behind an eyeglasses lens and used as a low vision aid. The present invention is directed to a bioptic periscope mounted to an eyeglasses lens and behind the lens can be constructed having the same focal length and magnification as a bioptic telescope, but because the light path in a periscope is folded so that there are three internal reflections of the light, a bioptic periscope occupies less space than a bioptic telescope having the same focal length and power of magnification.

Bioptic telescopes small enough to be attached to the lens of a pair of eyeglasses have been known in the art for many years, but most such devices suffer the disadvantage that they must be secured to the front of an eyeglasses lens, and thus extend forward from the eyeglasses lens for a distance of up to four inches. Most such devices are heavy and are immediately noticed by others, so as cosmetically undesirable. Currently available bioptic telescopes are either Galilean or Keplerian telescopes that are generally cylindrical in form and have both objective and eye piece lenses oriented along the axis of a cylinder. Currently available bioptic telescopes range in size from about one to about four inches in length and have magnifying powers ranging from about 2X to about 8X.

Examples of currently available bioptic telescopes used for correction of low vision include various distance telescopes made by manufacturers such as Keeler, Walters, and Selsi which can be purchased through American Low Vision International, P.O. Box 34564, San Antonio, Tex. 78218. Those telescopes are mounted on the outside of an eyeglasses lens. Eyeglasses having telescopes mounted on a lens are used for distance viewing, and with additional front lenses, can be used for near viewing.

Typically, those telescopes are mounted to eyeglasses by boring a hole of appropriate size through the lens either immediately above or below the normal line of sight and securing the telescope within the hole. Both head and eye movements are required to use a bioptic telescope mounted in an eyeglasses lens. Those movements must be practiced until they become automatic and natural for a patient to be successful in using a bioptic telescope. If the telescope is mounted above the line of sight, the patient first rotates the head downwardly to direct the telescope at the object the patient wishes to see, and then the patient rotates the eyes upwardly by a corresponding amount to bring the visual axis of the eye into coincidence with the optical axis of the telescope to visualize an object through the telescope.

One bioptic telescope lens system is comprised of multiple telescopes mounted on a single eyeglasses lens. For example, the "Honey Bee Lens" made by Designs for Vision Laboratory, New York, is used for patients having severely impaired vision. That low vision aid has three small telescopes, each containing thirteen lenses, attached to the exterior of each lens of the eyeglasses. The telescopes are aimed in different directions, and the three images from the three telescopes intersect at the patient's eye to provide a relatively wide field of view. The particular disadvantage of that three telescope system is that it is exceedingly heavy and uncomfortable to wear. Although cushion pads can reduce pressure on the bridge of the nose and on the ears, wearers frequently suffer discomfort and skin maceration due to the unavoidable weight of the eyeglasses frame and its total of six attached telescopes, when the apparatus is constructed for use with both eyes.

Bioptic telescopes mounted to the lenses of eyeglasses are worn by patients having impaired visual actuity so that those patients can pass the visual actuity tests required for operating a motor vehicle. Although a bioptic telescope can correct visual acuity sufficiently for such a person to pass the driver's test, such a unit is not totally practical for use while driving. In fact, a bioptic telescope used while driving is mounted above or below the visual axis of the patient's eye and both head and eye movements away from the center of the visual field are required for the patient to use a bioptic telescope. When the bioptic telescope is mounted directly in the center of the patient's visual axis, there is a blind area surrounding the telescope because the telescope itself blocks a portion of the patient's field of view. A driver wearing such an apparatus ordinarily drives while looking straight ahead through the lens of the eyeglasses. If the driver chooses to use the bioptic telescope mounted above the field of view to read a sign, the head must be tilted downwardly and the eyes turned upwardly to align them with the optical axis of the telescope. In doing so, the central visual field is narrowed from the normal field of about 60° in diameter to a visual field of approximately 6° in diameter. The patient using a bioptic telescope of this construction experiences a significant loss of peripheral visual acuity, and a large blind spot of about 10° width is created surrounding the telescope in the peripheral field of view, a most undesirable result while driving.

Small binocular and monocular telescopes are available from Carl Zeiss, of Oberkochen, West Germany, for mounting on eyeglasses for use as for correcting low vision and for use for microsurgery or other precision work. Those telescopic units can be adapted for mounting on the front of the eyeglasses frame by shortening the tubes and building an extra prismatic lens into the objective lens. Even specially constructed telescopic devices such as a Zeiss system modified in that manner would suffer all of the disadvantages and limitations of traditional bioptic devices. The Zeiss telescope narrows the central visual field, is heavy, and is cosmetically unacceptable to some patients because those telescopes extend from the front of the lens as much as three or four inches.

Galilean telescopes are frequently prescribed, together with a lens cap which includes a lens that can be added to the telescope which is called a reading cap, for viewing objects close to the patient, for patients having various types of retinal damage causing impaired vision. Those telescopes have all of the disadvantages common to bioptic telescope in general, including excessive weight, an unwieldy frontward extension, and the requirement that a patient wearing the device simultaneously tilt the head and rotate the eye to view an image through the device.

Many other bioptic telescopes are known in the art and are prescribed on an individual basis for a patient depending on the patient's specific needs. Binocular telescope systems are prescribed for patients desiring increased visual acuity for reading or close work. Monocular telescope systems can be prescribed for patients having reduced vision in one eye only or for an patient having vision in only one eye.

One available lens system, the "BITA" lens, a product of the Edwards Optical Corp., P.O. Box 3299, Virginia Beach, Va. 23454, is mounted behind the eyeglasses lens directly in front of the eye of the wearer. That system provides magnification, but the lens of the system comes dangerously close to the patient's eye. When the patient blinks, eyelashes invariably brush over the lenses, causing discomfort and irritation within a short period of time.

The disadvantages and difficulties encountered by patients wearing previously available bioptic low vision aids can be overcome by providing a bioptic apparatus which is periscopic rather than telescopic, and thus fits entirely behind the lens of a standard eyeglasses frame in an area to one side of the visual field of the wearer or above or below the normal visual axis of the wearer.

It is, therefore, an object of the present invention to provide a bioptic periscope low vision aid which does not require head movement by a patient wearing and using the apparatus.

Another object of the present invention is to provide a bioptic periscope which requires an eye rotation within a range which is comfortable for use as a low vision aid, i.e., less than about 50 degrees, and which eye rotation can be maintained by the user for extended periods of time if necessary.

Another object of the present invention is to provide a bioptic periscope which can be installed in corrective eyeglasses and which does not create a blind area in the peripheral field surrounding the bioptic apparatus. Such an apparatus does not suffer the disadvantage common to telescopes mounted in front of an eyeglasses lens, which create a magnified central visual field and a blind area surrounding that central visual field.

A further object of the present invention is to provide a bioptic periscope which provides the wearer with a relatively large field of view when in use, up to about 18°.

A further object of the present invention is to provide a bioptic periscope which is light enough that the device can be mounted to a standard eyeglasses frame chosen by the wearer rather than being mounted to a specially constructed or heavy duty eyeglasses frame.

A further object of the present invention is to provide a bioptic periscope and simple method of using the apparatus which requires little practice time for a patient to learn to use the apparatus.

Yet another object of the present invention is to provide an apparatus for increasing visual acuity which is cosmetically acceptable to the low vision patient because the apparatus can be concealed behind a standard eyeglasses frame and lens by means of a tinted glass wafer secured over the eyeglasses lens which obscures the view of the apparatus.

Another object of the present invention is to provide a bioptic periscope which can be mounted and used together with either a corrective eyeglasses lens or with a non-corrective eyeglasses lens.

A further object of the present invention is to provide a bioptic periscope and method which can be produced economically and provided to patients at less expense than presently available bioptic low vision aids.

Another object of the present invention is to provide a bioptic periscope which, when mounted behind the eyeglasses lens of a standard eyeglasses frame, permits clearance between the eye piece lens and the eye, eyelid, and eyelashes of the patient.

A further object of the present invention is to provide a bioptic periscope low vision aid which is comfortable for the patient to wear and use.

Yet another object of the present invention is to provide a behind-the-lens bioptic periscope which provides a high quality image with little or no chromatic or optical distortion when used for viewing by the patient.

These and other objects, features, and advantages of the invention will become evident in light of the following detailed description.

SUMMARY OF THE INVENTION

These objects and advantages are accomplished by providing an apparatus for increasing visual acuity while viewing an image, comprising a roof prism having an apex with apex faces adjacent thereto, an eye piece lens mounted to a first apex face of the roof prism, and an objective lens mounted to a second apex face of the roof prism and to the lens of a pair of eyeglasses. The objective lens is mounted to the eyeglasses lens at a point at which the eye of a patient wearing the glasses must be rotated through an angle of between about 25° to about 50° relative to the visual axis of the patient's eye when looking straight ahead to view an image through the apparatus.

Also provided is a method for viewing an object at a distance comprising rotating the eye so that the visual axis of the eye coincides with the optical axis of a bioptic periscope mounted to an eyeglasses lens in an eyeglasses frame, reflecting an image within a bioptic periscope, magnifying the image, and viewing the image.

DETAILED DESCRIPTION OF THE DRAWINGS

Figure 1:
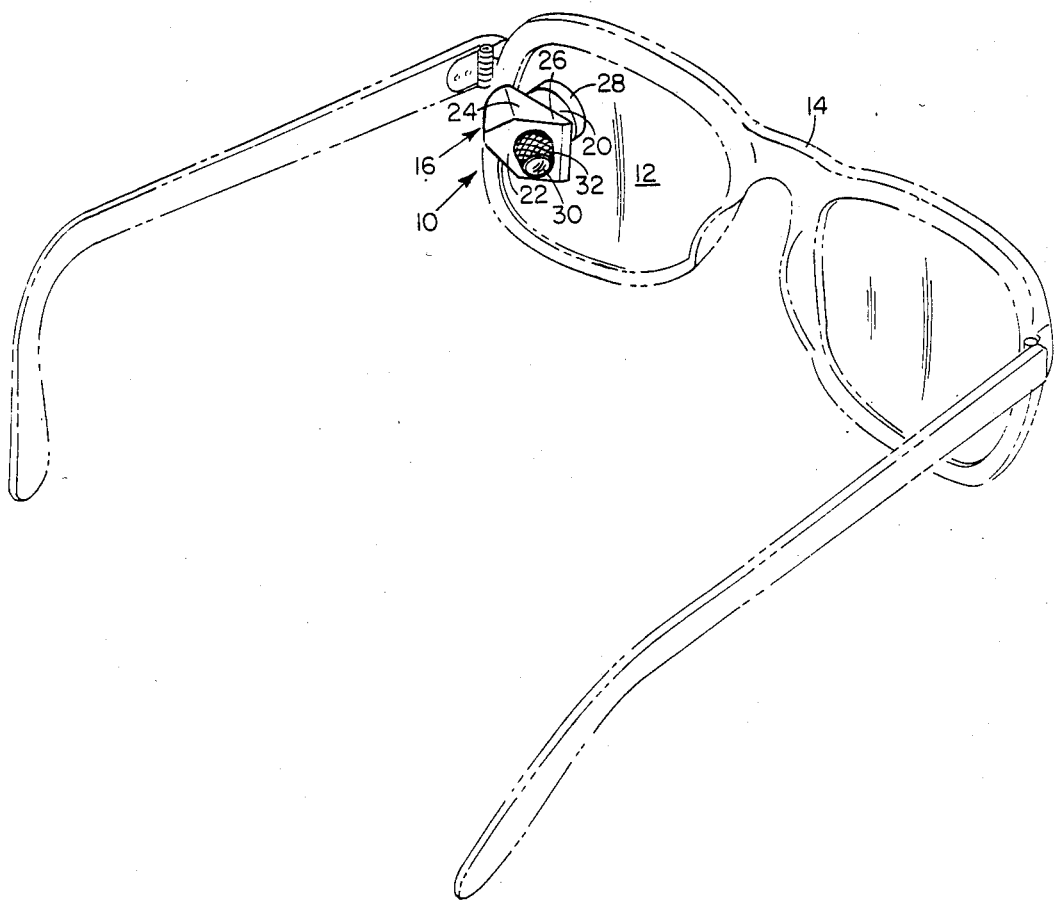
FIG. 1 is a perspective view of the apparatus of the present invention shown mounted to the lens of a pair of eyeglasses.

The bioptic periscope of the present invention is indicated generally at reference numeral 10. Bioptic periscope 10 is mounted to an eyeglasses lens 12 which is mounted in the frame 14 of a pair of eyeglasses. Bioptic periscope 10, in a presently preferred embodiment, is mounted to an eyeglasses lens 12 which is decentered, that is, which has its optical center located at the point at which the bioptic periscope 10 is mounted. As will be described, bioptic periscope 10 can be mounted in a hole 28 (see FIG. 2) through eyeglasses lens 12. The bioptic periscope 10 is preferably mounted to a lateral side of the visual field. The axis of the visual field is shown as the arrow at reference number 78 (see FIG. 2), and the visual field is described by an angle of from about 25° to about 50° on both sides of the visual axis 78 when the eye is looking straight ahead. Bioptic periscope 10 is comprised of a housing 16, which in a presently preferred embodiment comprises two halves 22 and 24 secured together by machine screws 26, an eyepiece sleeve 18 integral with half 22, and an objective sleeve 20 integral with half 24. The two halves 22 and 24 enclose roof prism 44 (see FIG. 2). The eyepiece sleeve 18 receives eyepiece 32 therein and objective sleeve 20 receives objective lens 60 therein. Housing 16 is preferably constructed of forged steel. The bioptic periscope 10 is mounted to the lens 12 of a pair of eyeglasses by securing objective sleeve 20 to the lens 12.

Figure 2:
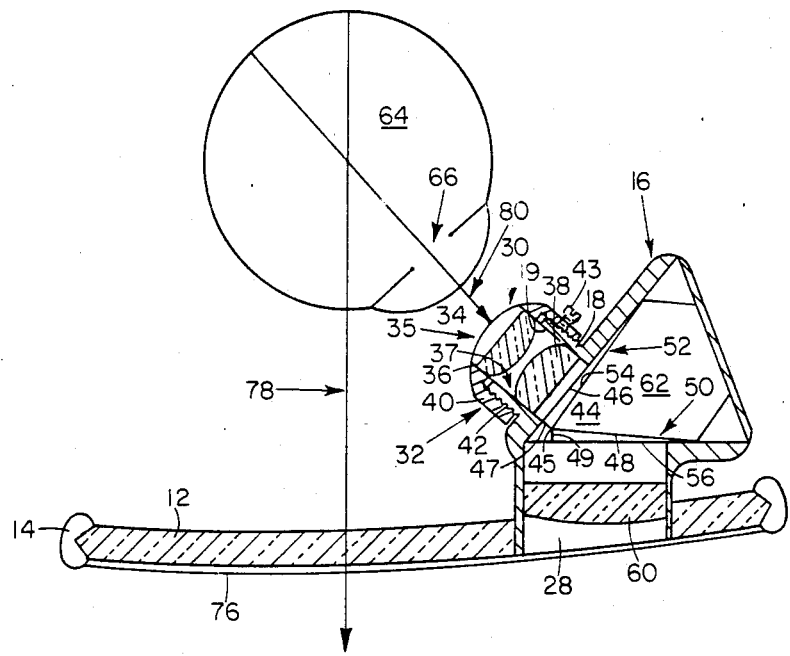
FIG. 2 is a cross-section showing an alternate embodiment of the apparatus of the present invention in which the apparatus is mounted in a hole in the lens of a pair of eyeglasses, schematically showing an eye rotated sufficiently so that the visual axis of the eye coincides with the optical axis of the eye piece lens.

Because mounting of any apparatus within the visual field creates a visual obstruction, or "blind spot", in the peripheral visual field surrounding the apparatus, placement of the bioptic periscope 10 on lens 12 at a point off the visual axis 78 is important. However, the muscles which turn the eye to one side can only rotate the eye through an angle of about 50° temporally, and maintaining the eye in that position is very difficult. The bioptic periscope 10 of the present invention can be mounted to an eyeglasses lens 12 which is optically decentered so that the eyeglasses lens 12 itself bends light toward the eye of the patient and the patient does not have to rotate the eye through as large an angle. However, the eyeglasses lens 12 can be either plano, i.e., having no optical correction, or decentered, i.e. having the optical centerpoint displaced laterally. In the presently preferred embodiment as shown in FIG. 2, the rotation of the eye required for viewing through bioptic periscope 10 is about 36° due to wedge prisms 46 and 48. The hole 28 in which bioptic periscopic apparatus 10 is mounted is located generally in the temporal area of lens 12, although it can be placed in any part of the visual field lateral to visual axis 78.

Referring to FIG. 2, the eye piece 32 at one end 30 of the bioptic periscope 10 is of modified "Erfle" design as described in "Design of Fire Control Optics", pages 205-210 published in the Ordinance Corps Manual (March 1953), Office of the Chief of Ordinance, Washington, D.C. In a presently preferred embodiment, the Erfle design eye piece 32 is an achromatic, meniscus-shaped doublet lens made of lens 34 and lens 36, which are cemented together to form a doublet lens 35, and an equally biconvex singlet lens 38. Lenses 35 and 38 are mounted spaced apart by air space 37 within collar 40.

Collar 40 of eye piece 32 is provided with a threaded portion 42 received upon the threads 19 of eye piece sleeve 18, permitting collar 40 to be rotated in one direction or another for focusing from a range of infinity to about three feet from the eye of the patient. Each turn of the collar 40 upon threads 42 provides one millimeter of axial movement of eye piece 32. Machine screw 43 secures threaded portion 42 of collar 40 at a selected focal length upon threads 19 of eye piece sleeve 18. The eye piece sleeve 18 is integral with housing 16.

In a presently preferred embodiment, roof prism 44 is a Schmidt prism having an apex angle of about 46°. Roof prism 44 is provided with an apex 45, a first apex face 52 and a second apex face 50 adjacent thereto. Wedge prisms 46 and 48 can be mounted with their respective bases 47 and 49 adjacent the apex faces 50 and 52 of roof prism 44 to provide additional bending of light along the path shown by the arrow at reference numeral 80 (see FIG. 3), thereby decreasing the angle through which the patient's eye 64 must rotate to align the visual optical axis 78 with the axis of eye piece 32, which is also indicated by arrow 80 in FIGS. 2 and 3. Although mounted adjacent the apex faces 50 and 52 of roof prism 44, there are air spaces 54 and 56 between roof prism 44 and each respective wedge prism 46 and 48 to allow for the transmission, rather than the reflection, of light therethrough. Due to their small size, air spaces 54 and 56 appear to occupy the same space as wedge prisms 46 and 48 in FIG. 2. In a presently preferred embodiment, wedge prisms 46 and 48 each have an apex angle of about 4.8°. However, those skilled in the art who have the benefit of this disclosure will recognize that wedge prisms having other apex angles will be desirable according to the needs of each individual patient.

When the eye 64 is rotated so that the visual axis 78 coincides with the optical axis shown at arrow 80 of eye piece 32, the incident light received through the bioptic periscope 10 is received within the pupil 66 of the eye 64 of the patient. As noted above, the rotation of the eye 64 required to view light passing through the bioptic periscope 10 ranges from about 25° to about 50° relative to visual axis 78, depending on the optical qualities of the roof prism 44 and the location of bioptic periscope 10. In a presently preferred embodiment, the bioptic periscope 10 is mounted to lens 12 at a location which requires a rotation of eye 64 of between about 30 to about 40 degrees, and as noted above, preferably 36 degrees. The optical axis 80 of the eye piece 32 of bioptic periscope 10 coincides with the visual axis 78 of pupil 66 of the eye 64 only when the eye 64 has performed that rotation. The angle of eye rotation required also depends upon the distance between the eye 64 of the patient and eye piece 32, which depends on the size, shape and construction of eyeglasses frame 14. That distance is sufficient so that the eyelashes of most patients do not touch eye piece 32 so that bioptic periscope 10 can be comfortably worn when mounted within a variety of different eyeglasses frames 14.

Figure 3:
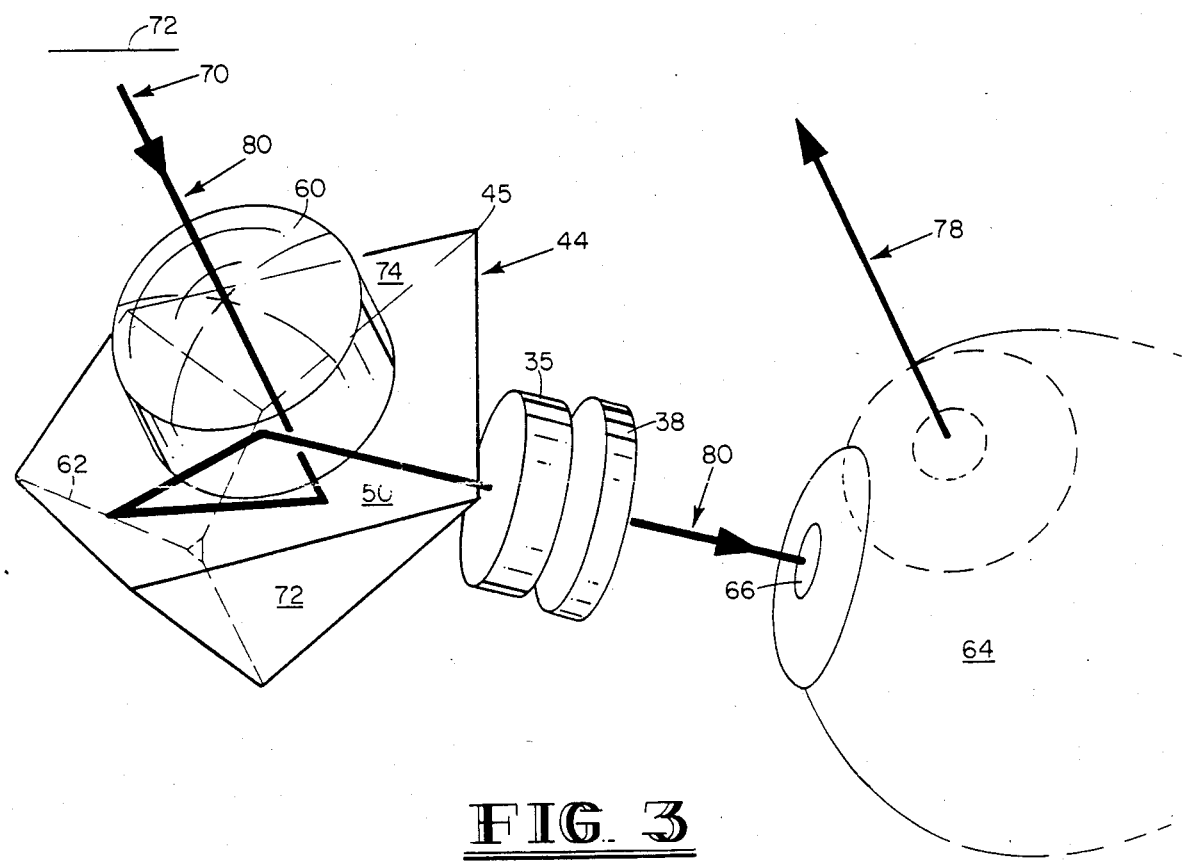
FIG. 3 is a schematic diagram showing the path taken by light passing through the apparatus of the present invention.

FIG. 3 is a schematic representation of the path which light takes through the periscopic bioptic apparatus 10. Light is reflected from an image 72, passes through the objective lens 60, and then through the second apex face 50 of roof prism 44 along the path shown at reference numeral 80. The light is internally reflected from the first apex face 52 of roof prism 44. The light traverses the prism a second time and is reflected from roof 62 of prism 44. Roof 62 reflects the light back to the second apex face 50 where the light is reflected a third time, causing the light to traverse roof prism 40 a fourth time. The light is then transmitted through prism face 52, singlet lens 38, and doublet lens 35. The light is then received within the pupil 66 of eye 64 when the eye 64 is rotated sufficiently as described above. There is no internal reflection of light on faces 72 and 74 of roof prism 44. As can be seen from the above description, the light traverses roof prism 44 four times, and those four traverses increase the focal length of bioptic periscope 10 sufficiently to allow magnification of image 72 in a range of from about 6X to about 24X, depending on the powers of objective lens 60 and the eye piece lenses 35 and 38. In a presently preferred embodiment of the invention, the bioptic periscope 10 provides a visual field of about 14° and a magnification of 12X. Objective lens 18 and eyepiece lenses 35 and 38 can be concave if minification rather than magnification is prescribed for a patient.

Base prisms (not shown) can be used in front of eye piece 32 and/or in the eyeglasses lens 12 to lessen the necessary angle of rotation of the eye, as is known in the art. The roof prism roof 62 can be silvered rather than enclosing the bioptic periscope 10 in a housing, if desired. A reading cap (not shown) can be placed over the objective lens 60 if greater magnification is prescribed for the patient, as in known in the art. A tinted wafer 76 cab be mounted over eyeglasses lens 12 to conceal the bioptic periscope 10 behind the eyeglasses lens 12.

Although the invention has been described in conjunction with the foregoing specific embodiment, many alternatives, variations and modifications are apparent to those of ordinary skill in the art. Those alternatives, variations and modifications are intended to fall within the spirit and scope of the following claims.

I claim:

1. An apparatus for increasing visual acuity while viewing an image comprising:
    a roof prism having an apex with apex faces adjacent thereto;
    an eye piece lens mounted to a first apex face of said roof prism; and
    an objective lens mounted to a second apex face of said roof prism and to the lens of a pair of eyeglasses, said objective lens being positioned between the lens of the eyeglasses and the eye of a patient wearing the eyeglasses at a point at which the patient can view an object through said objective lens by rotating the eye through an angle of between about 25° to about 50° relative to the visual axis of the patient's eye when looking straight ahead.

2. The apparatus of claim 1 in which said eye piece lens is threadably mounted to said roof prism.

3. The apparatus of claim 1 additionally comprising a wedge prism mounted with the base thereof adjacent one of the apex faces of said roof prism for bending light rays toward the base of the wedge prism.

4. The apparatus of claim 3 wherein said wedge prism is mounted between said eye piece and a first apex face.

5. The apparatus of claim 4 wherein a first wedge prism is mounted between said eye piece lens and the first apex face and a second wedge prism is mounted between said objective lens and the second apex face.

6. The apparatus of claim 1 additionally comprising a reading cap secured over said objective lens.

7. The apparatus of claim 1 comprising a tinted glass wafer mounted over the lens of the eyeglasses for concealing the apparatus.

8. The apparatus of claim 1 wherein both the eye piece lens and the objective lens are convex.

9. The apparatus of claim 1 wherein the lens of the eyeglasses has an optical center point which is displaced laterally.

10. The apparatus of claim 1 wherein said objective lens is mounted to the lens of the eyeglasses at a point at which the eye of the patient must be rotated through an angle of between about 30° to about 40° relative to the visual axis of the patient's eye.

11. The apparatus of claim 1 wherein said roof prism, said eye piece lens and said objective lens are enclosed in a housing.

12. The apparatus of claim 1 wherein said objective lens is mounted in a hole in the lens of the eyeglasses.

13. The apparatus of claim 1 wherein said objective lens is positioned completely behind the lens of the eyeglasses.

14. The apparatus of claim 1 wherein said objective lens is positioned at a point at which the patient rotates the eye temporally through an angle of between about 25° to about 50°.

15. A method for constructing a variable focus bioptic periscopic system mounted completely behind the lens frame front of a pair of eyeglasses comprising:
    attaching an eye piece to the first apex space of a roof prism;
    attaching an objective lens to a second apex face of the roof prism; and
    mounting the objective lens to an eyeglass lens at a point at which the eye piece, prism, or objective lens do not protrude out from behind the frame front or lens when the pair of eyeglasses in which the lens is located is worn by a patient.

16. The method of claim 15 additionally comprising integrally attached a wedge prism to a face of said roof prism, with the base of the wedge prism adjacent the apex of the said roof prism.

17. A method for viewing an object at a distance comprising:
    rotating the eye temporally so that the visual axis of the eye coincides with the optical axis of a bioptic periscope positioned between the lens in an eyeglasses frame and the eye of the patient wearing the eyeglasses;
    reflecting the light reflected from an image within the bioptic periscope;
    magnifying the image; and
    viewing the magnified image.

18. The method of claim 17 wherein the eye is rotated temporally through an angle of from about 25 to about 50 degrees.

19. The method of claim 17 wherein the eye is rotated temporally through an angle of from about 30 to about 40 degrees.

20. The method of claim 17 wherein the image is magnified by from about 6 to about 24 times.

21. The method of claim 17 wherein the eye of the patient is rotated temporally without movement of the head of the patient.

22. An apparatus for increasing visual acuity comprising:
    a Schmidt roof prism having an apex with apex faces adjacent thereto;
    an eye piece lens mounted to a first apex face of said Schmidt roof prism; and
    an objective lens mounted to a second apex face of said Schmidt roof prism and to the lens of a pair of eyeglasses, said objective lens being mounted to the lens of the eyeglasses from behind at a point at which the eye of a patient wearing the eyeglasses must be rotated temporally through an angle of about 25° to about 50° relative to the visual axis of the eye of the patient when looking straight ahead to view an image therethrough.

23. A method for constructing a variable focus bioptic periscopic system mounted behind the lens of a pair of eyeglasses comprising:

attaching an eye piece to the first apex face of a Schmidt roof prism;

attaching an objective lens to a second apex face of the Schmidt roof prism;

attaching a wedge prism to an apex face of the Schmidt roof prism with the base of the wedge prism adjacent to the apex of the Schmidt roof prism; and mounting the objective lens to an eyeglass lens from behind.

* * * * *